Dec. 7, 1937.   S. SCHNELL   2,101,692
BRAKE SHOE GUIDE
Filed Sept. 12, 1935

INVENTOR.
STEVE SCHNELL
BY
ATTORNEY.

Patented Dec. 7, 1937

2,101,692

UNITED STATES PATENT OFFICE 2,101,692

BRAKE SHOE GUIDE

Steve Schnell, Overland, Mo., assignor to Wagner Electric Corporation, St. Louis, Mo., a corporation of Delaware Application September 12, 1935, Serial No. 40,197

10 Claims. (Cl. 188—78)

My invention relates to guides and more particularly to yieldable guides for centralizing a brake shoe.

Among the objects of my invention is to construct an economical and efficient guide of the leaf spring type for maintaining a brake shoe in a centralized position when the shoe is not in engagement with the brake drum but which will yield to permit the brake shoe to properly engage the drum when the brake is applied.

Figure 1:
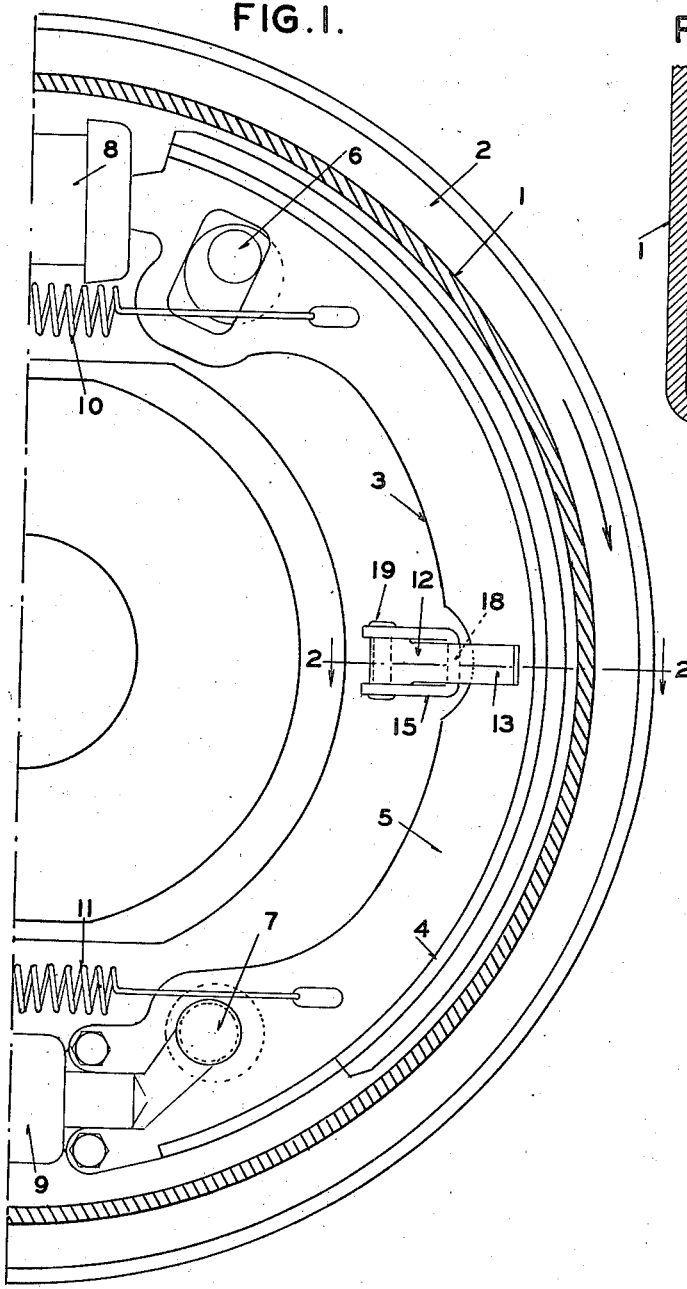
Figure 2:
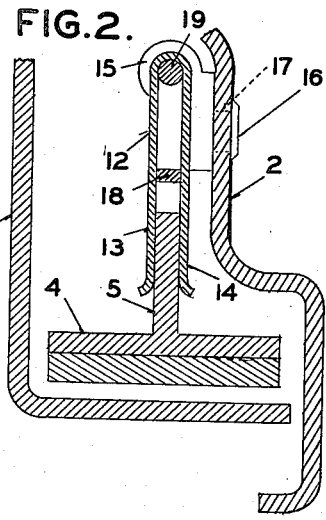
Figure 3:
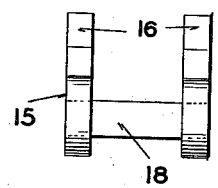

Other objects of my invention will become apparent from the following description taken in connection with the accompanying drawing showing a single embodiment. In the drawing, Figure 1 is a view of a portion of a brake showing my invention embodied therein; Figure 2 is a cross sectional view on the line 2—2 of Figure 1; and Figure 3 is a top view of the attaching member before attachment to the backing plate.

I have found my yieldable guide means to be very practical and efficient for centering brake shoes and I have therefore illustrated it so employed but it is to be understood that it can readily be adapted for use in other mechanisms where such a device is required.

Referring to the drawing in detail, Figure 1 discloses a portion of a brake drum 1 suitably secured to a wheel of a vehicle with its open side closed by means of a backing plate 2 secured to the fixed part of the vehicle. A brake shoe 3 (one only being shown) is mounted within the drum, and is of the T-section type having a lining carrying portion 4 and a reinforcing web 5. The shoe is formed to anchor at its upper end upon the adjustable pin 6 carried by the backing plate, and at its lower end on the pin 7 also carried by the backing plate. In the brake shown the shoe is adapted to be applied to the drum by the hydraulic motors 8 and 9.

When the drum is rotating in a clockwise direction, as shown by the arrow, the shoe will anchor on the pin 7, and when the drum is rotating in the opposite direction the shoe will anchor on the pin 6. The shoe is normally maintained in contact with the anchor pins by means of the retracting springs 10 and 11.

The braking surface of the drum is normally of cylindrical formation, but as a result of any extended application of the brake shoe to the drum surface the heat created by the frictional contact will cause the inner drum friction surface to become slightly conical, that is flared. As a result of this flaring of the drum the brake shoe in order to maintain its lining surface in uniform and complete contact with the braking surface of the drum must tilt or rock slightly upon its anchor pin. It is thus seen that to have an efficient brake the shoe must be so mounted and guided that it is free to follow the drum surface. At the same time it is also desirable that the shoe always returns to its central untilted position (a position wherein the lining surface is concentric to the drum surface when the drum surface is cylindrical) when the shoe is in its retracted or disengaged position.

In accordance with my invention I have designed a resilient guide which will readily permit the brake shoe to rock about its anchor and thereby maintain uniform and complete contact with the drum, and at the same time always insure that the shoe will return to its normal central position when the brake is disengaged from the drum. The resilient guide comprises a U-shaped leaf spring member 12, the legs 13 and 14 of which contact opposite sides of the web 5 of the shoe. This U-shaped spring is attached to the backing plate by means of a U-shaped member 15, each leg of which has formed thereon a projecting portion 16 which extends through suitable openings 17 in the backing plate, and is peened over to rigidly secure the holding member to the backing plate. The base portion 18 of the U-shaped holding member extends between the legs of the U-shaped resilient spring and the base portion of the spring is clamped between the ends of the leg of the U-shaped holding member by means of a rivet 19, as shown.

When the brake shoe is applied to the drum and it becomes necessary for it to tilt slightly in order to maintain uniform and complete contact with the drum either or both of the legs of the spring 13 and 14 may readily yield outwardly relatively to each other to permit such tilting. If during the braking application it is necessary for the entire shoe to shift laterally in either direction, that is the axial direction of the drum, one of the legs, depending on the direction of shift, will yield and permit this shifting, but the other leg of the spring will not follow the web of the shoe due to the fact that the base portion 18 of the holding member 15 will not permit such movement. As soon as the brake is released and brought to its retracted position by the springs 10 and 11 the legs 13 and 14 of the U-shaped spring will immediately centralize the brake shoe.

It is thus seen that I have produced a very efficient guiding means which normally maintains the shoe properly centered when it is not engaged with the drum, and permits free action of the shoe to follow the braking surface of the drum when the shoe is applied to the drum. The device is very cheap to manufacture because of the small number of parts required and the ease with which it may be attached to the backing plate of the brake mechanism.

Having fully described my invention, what I claim as new and desire to secure by Letters Patent of the United States is:

1. In a brake construction, a support, a brake shoe mounted thereon, and resilient guiding means for said shoe, said guiding means comprising a pair of yieldable elements having end portions contacting opposite sides of a portion of the brake shoe, means for securing the other end portions of the yieldable members to the support, and means for preventing said elements from moving toward each other, said elements being unrestrained from relative movement away from each other under the influence of movement of the shoe.

2. In a brake construction, a support, a brake shoe mounted thereon, and resilient guiding means for said shoe, said guiding means comprising a U-shaped leaf spring having the flat surfaces of its legs positioned in planes parallel with the plane in which the shoe is positioned and extending on opposite sides of a portion of the shoe and means carried by the support for receiving and clamping the base end of the spring whereby the legs will yieldably oppose lateral movement of the shoes and also guide the shoe during its engaging and disengaging movement.

3. In a brake construction, a support, a brake shoe mounted thereon, and a resilient guide for said brake shoe, said guide comprising a U-shaped resilient member the legs of which extend on opposite sides of a portion of the brake shoe, and means for attaching the resilient member to the support and for preventing the legs thereof from moving toward each other, said legs being unrestrained by said means from being flexed relatively away from each other by said shoe.

4. In a brake construction, a support, a brake shoe mounted thereon and provided with a web portion, and a guide for the brake shoe comprising a resilient U-shaped member receiving the web portion of the shoe between its legs, means for attaching the base of the U-shaped member to the support and means rigid with the support for preventing the legs of the member from movement toward each other, said legs being free to move relatively away from each other.

5. In a brake construction, a backing plate, a brake shoe having a web portion and mounted on the backing plate, and guide means for the brake shoe, said guide means comprising a U-shaped member secured to the backing plate, a U-shaped leaf spring having its legs extending on opposite sides of the base portion of the member and receiving the web of the brake shoe between the ends of its legs, and means for clamping the base of the U-shaped spring between the legs of the U-shaped member.

6. A guide comprising a U-shaped leaf spring the legs of which are adapted to receive a member to be guided, an element adapted to be secured to a support and provided with means for clamping the edges of base end of the U-shaped spring, and means carried by said element for preventing the legs of the U-shaped spring from movement toward each other.

7. A guide comprising a U-shaped member adapted to be secured to a support, a U-shaped leaf spring having its legs extending on opposite sides and beyond the base portion of the member, and a pin for clamping the base of the spring between the ends of the legs of the member.

8. A guide for a brake shoe comprising two interengaging U-shaped members secured together, the legs of one of said members being adapted to receive a portion of a brake shoe and the other of said members being adapted to be secured to a support.

9. In a brake construction, a support, a brake shoe mounted thereon, and means secured to the support for yieldably maintaining the shoe in a predetermined lateral position with respect to said support, said means comprising a pair of substantially parallel yieldable elements having portions contacting opposite sides of a portion of the shoe and opposing lateral movement of the shoe, and stop means acting on the yieldable elements at a point spaced from the point where said elements are secured to the support and limiting movement of each yieldable element in one direction.

10. In a brake construction, a support, a brake shoe mounted thereon, and means secured to the support for yieldably maintaining the shoe in a predetermined lateral position with respect to said support, said means comprising two yieldable members each opposing lateral motion of the shoe in one direction from its predetermined lateral position, and stop means limiting movement of each yieldable element in the direction opposite to the direction of movement of the shoe which it opposes.

STEVE SCHNELL.